(12) United States Patent
Velasco et al.

(10) Patent No.: US 11,085,139 B2
(45) Date of Patent: Aug. 10, 2021

(54) SYSTEM AND METHOD FOR DETECTING A LOW FLOW CONDITION DURING THE FILLING OF A WASHING MACHINE APPLIANCE

(71) Applicant: Haier US Appliance Solutions, Inc., Wilmington, DE (US)

(72) Inventors: Gabriel Andres Velasco, Louisville, KY (US); Mary Joy Frances Cardilino, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 78 days.

(21) Appl. No.: 16/653,091

(22) Filed: Oct. 15, 2019

(65) Prior Publication Data
US 2021/0108356 A1    Apr. 15, 2021

(51) Int. Cl.
*D06F 34/22*    (2020.01)
*D06F 39/08*    (2006.01)
*G01H 1/00*    (2006.01)
*G01M 99/00*    (2011.01)
*D06F 33/00*    (2020.01)

(52) U.S. Cl.
CPC .............. *D06F 34/22* (2020.02); *D06F 33/00* (2013.01); *D06F 39/087* (2013.01); *D06F 39/088* (2013.01); *G01H 1/003* (2013.01); *G01M 99/005* (2013.01); *D06F 2202/08* (2013.01); *D06F 2202/12* (2013.01); *D06F 2204/086* (2013.01)

(58) Field of Classification Search
CPC ...................................................... D06F 34/22
See application file for complete search history.

(56) References Cited

U.S. PATENT DOCUMENTS

| 6,336,348 | B1  | 1/2002 | Lee et al. |
| 9,328,451 | B2  | 5/2016 | Kappler et al. |
| 10,060,068 | B2 | 8/2018 | Carrer et al. |
| 2012/0089258 | A1* | 4/2012 | Wong .................... D06F 37/203 700/279 |
| 2013/0233027 | A1* | 9/2013 | Carrer .................... D06F 33/00 68/12.27 |

FOREIGN PATENT DOCUMENTS

WO    WO2018076082 A1    5/2018

* cited by examiner

*Primary Examiner* — Jason Y Ko
(74) *Attorney, Agent, or Firm* — Dority & Manning, P.A.

(57) ABSTRACT

A washing machine appliance includes a sump for collecting wash fluid, a water control valve for supplying wash fluid during a fill cycle, and an accelerometer for measuring tub accelerations. A controller is configured for opening the control valve to provide the flow of water into the wash tub, measuring an acceleration of the wash tub using the accelerometer, and determining that a low flow condition exists based at least in part on the acceleration of the wash tub.

20 Claims, 6 Drawing Sheets

FIG. 7

SYSTEM AND METHOD FOR DETECTING A LOW FLOW CONDITION DURING THE FILLING OF A WASHING MACHINE APPLIANCE

FIELD OF THE INVENTION

The present subject matter relates generally to washing machine appliances, or more specifically, to accurate water level detection within washing machine appliances.

BACKGROUND OF THE INVENTION

Washing machine appliances generally include a tub for containing water or wash fluid, e.g., water and detergent, bleach, and/or other wash additives. A basket is rotatably mounted within the tub and defines a wash chamber for receipt of articles for washing. During normal operation of such washing machine appliances, the wash fluid is directed into the tub and onto articles within the wash chamber of the basket. The basket or an agitation element can rotate at various speeds to agitate articles within the wash chamber, to wring wash fluid from articles within the wash chamber, etc. During a spin or drain cycle, a drain pump assembly may operate to discharge water from within sump.

Conventional washing machine appliances perform fill cycles by opening a water valve for the time necessary to achieve a target water level based on a predetermined standard flow rate. However, water pressures may vary widely between different appliance installations, thereby resulting in variation in the actual water flow rate, and thus the time needed to dispense a particular amount of water. Failing to compensate for such pressure or flow rate variations may result in underfilling or overfilling the wash tub. Washing machine appliances could include water flow meters, but such meters are typically complex and costly.

Accordingly, a washing machine appliance having improved features for determining the water level in the sump would be desirable. More specifically, a washing machine appliance with an improved system and method for monitoring the flow rate of wash fluid filling the wash tub would be particularly beneficial.

BRIEF DESCRIPTION OF THE INVENTION

Advantages of the invention will be set forth in part in the following description, or may be apparent from the description, or may be learned through practice of the invention.

In accordance with one exemplary embodiment of the present disclosure, a washing machine appliance is provided, including a cabinet, a wash tub positioned within the cabinet and defining a wash chamber for receipt of a load of articles for washing, a control valve for regulating a flow of water from a water supply into the wash chamber, and an accelerometer operably coupled to the wash tub. A controller is operably coupled to the control valve and the accelerometer and is configured for: opening the control valve to provide the flow of water into the wash tub, measuring an acceleration of the wash tub using the accelerometer, and determining that a low flow condition exists based at least in part on the acceleration of the wash tub.

In accordance with another exemplary embodiment of the present disclosure, a method of operating a washing machine appliance is provided. The washing machine includes a wash tub, an accelerometer operably coupled to the wash tub, and a control valve for supplying a flow of water into the wash tub. The method includes opening the control valve to provide the flow of water into the wash tub, measuring an acceleration of the wash tub using the accelerometer, and determining that a low flow condition exists based at least in part on the acceleration of the wash tub.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
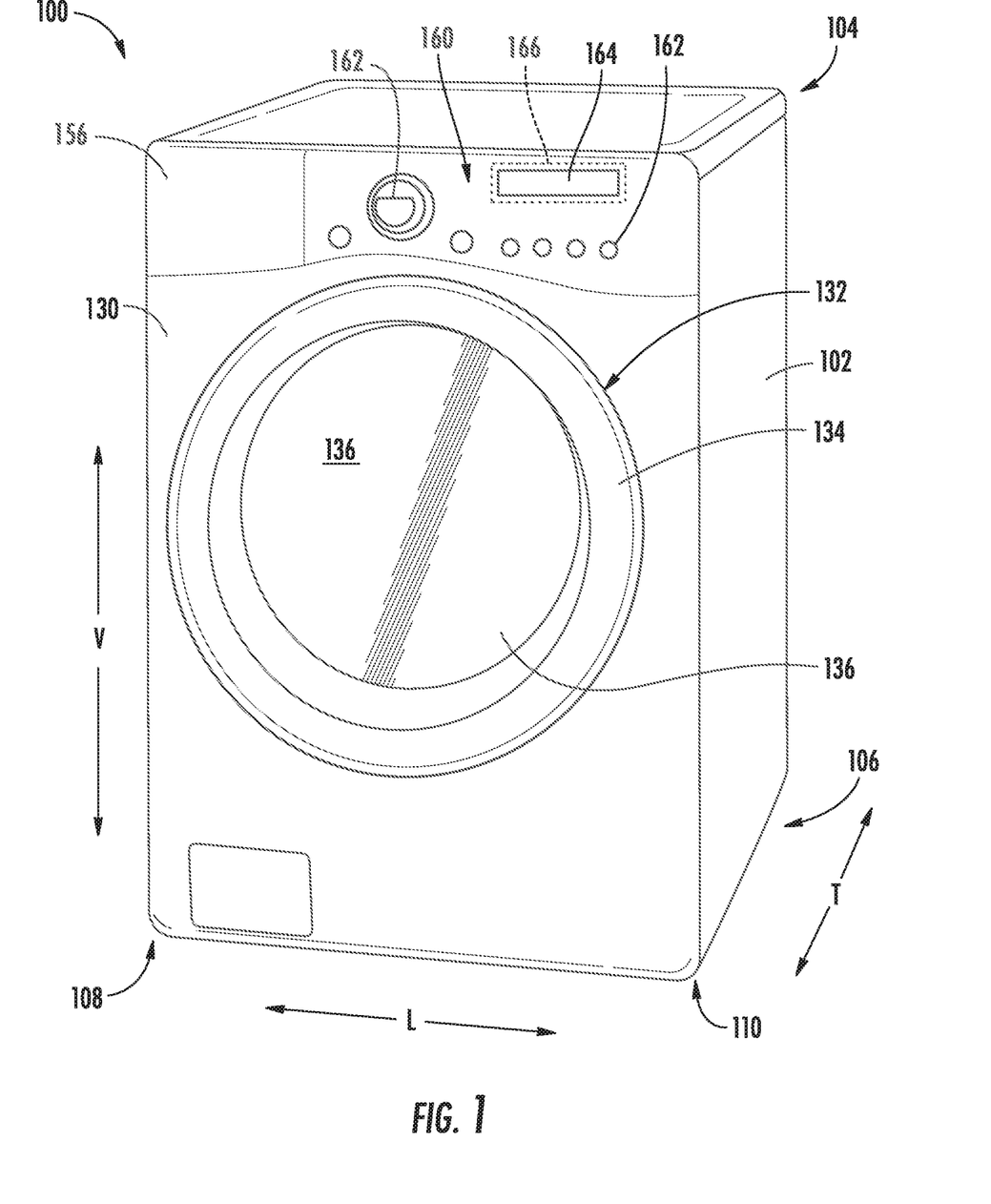
FIG. 1 provides a perspective view of an exemplary washing machine appliance according to an exemplary embodiment of the present subject matter.
Figure 2:
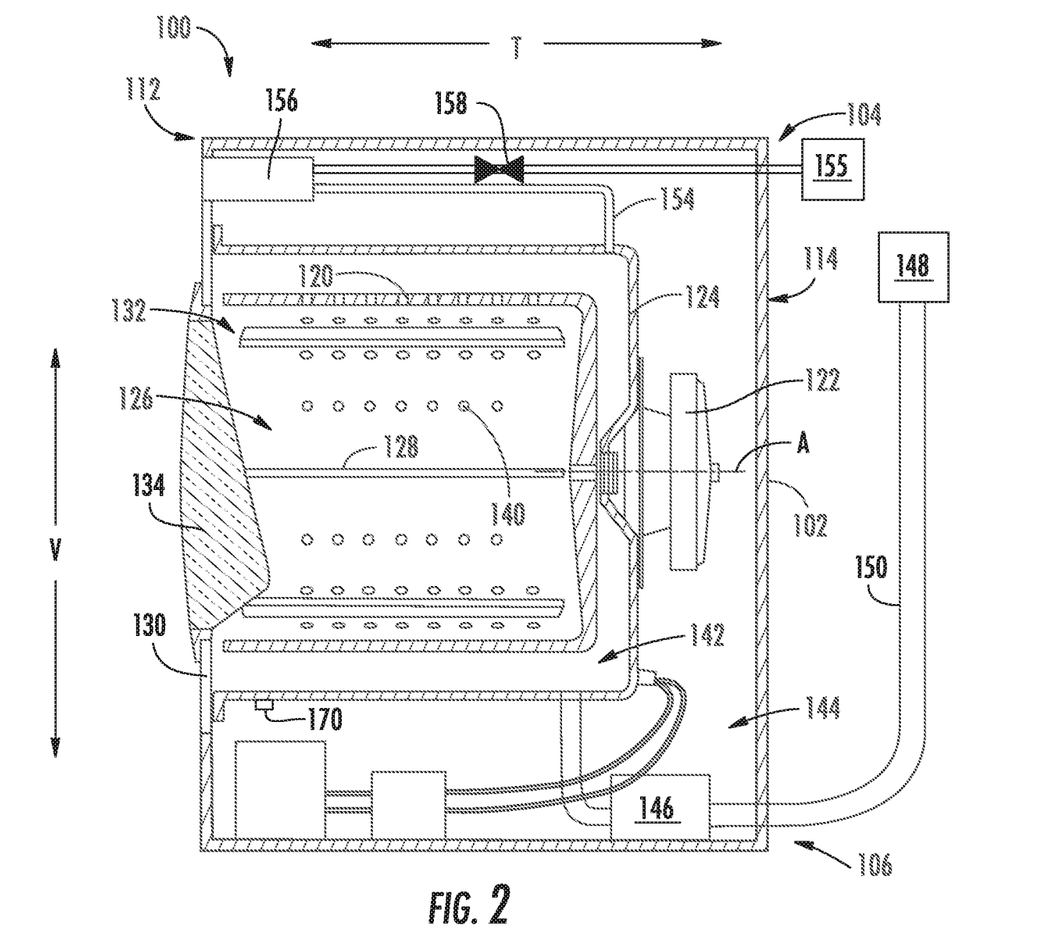
FIG. 2 provides a side cross-sectional view of the exemplary washing machine appliance of FIG. 1.

Referring now to the figures, FIG. 1 is a perspective view of an exemplary horizontal axis washing machine appliance 100 and FIG. 2 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined. Washing machine appliance 100 includes a cabinet 102 that extends between a top 104 and a bottom 106 along the vertical direction V, between a left side 108 and a right side 110 along the lateral direction, and between a front 112 and a rear 114 along the transverse direction T.

Referring to FIG. 2, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. Indeed, for simplicity of discussion, these terms may all be used interchangeably herein without limiting the present subject matter to any particular "wash fluid."

Wash basket 120 may define one or more agitator features that extend into wash chamber 126 to assist in agitation and cleaning articles disposed within wash chamber 126 during operation of washing machine appliance 100. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 102 also includes a front panel 130 which defines an opening 132 that permits user access to wash basket 120 of wash tub 124. More specifically, washing machine appliance 100 includes a door 134 that is positioned over opening 132 and is rotatably mounted to front panel 130. In this manner, door 134 permits selective access to opening 132 by being movable between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not shown) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

A spout 154 is configured for directing a flow of fluid into wash tub 124. For example, spout 154 may be in fluid communication with a water supply 155 (FIG. 2) in order to direct fluid (e.g., clean water or wash fluid) into wash tub 124. Spout 154 may also be in fluid communication with the sump 142. For example, pump assembly 144 may direct wash fluid disposed in sump 142 to spout 154 in order to circulate wash fluid in wash tub 124.

As illustrated in FIG. 2, a detergent drawer 156 is slidably mounted within front panel 130. Detergent drawer 156 receives a wash additive (e.g., detergent, fabric softener, bleach, or any other suitable liquid or powder) and directs the fluid additive to wash chamber 124 during operation of washing machine appliance 100. According to the illustrated embodiment, detergent drawer 156 may also be fluidly coupled to spout 154 to facilitate the complete and accurate dispensing of wash additive.

In addition, a water supply valve or control valve 158 may provide a flow of water from a water supply source (such as a municipal water supply 155) into detergent dispenser 156 and into wash tub 124. In this manner, control valve 158 may generally be operable to supply water into detergent dispenser 156 to generate a wash fluid, e.g., for use in a wash cycle, or a flow of fresh water, e.g., for a rinse cycle. It should be appreciated that control valve 158 may be positioned at any other suitable location within cabinet 102. In addition, although control valve 158 is described herein as regulating the flow of "wash fluid," it should be appreciated that this term includes, water, detergent, other additives, or some mixture thereof.

A control panel 160 including a plurality of input selectors 162 is coupled to front panel 130. Control panel 160 and input selectors 162 collectively form a user interface input for operator selection of machine cycles and features. For example, in one embodiment, a display 164 indicates selected features, a countdown timer, and/or other items of interest to machine users.

Operation of washing machine appliance 100 is controlled by a controller or processing device 166 (FIG. 1) that is operatively coupled to control panel 160 for user manipulation to select washing machine cycles and features. In response to user manipulation of control panel 160, controller 166 operates the various components of washing machine appliance 100 to execute selected machine cycles and features.

Controller 166 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 160 and other components of washing machine appliance 100 may be in communication with controller 166 via one or more signal lines or shared communication busses.

According to exemplary embodiments, washing machine appliance 100 may include an accelerometer 170 that is operably coupled to wash tub 124. Specifically, as best illustrated in FIG. 2, accelerometer 170 is mounted to a front end of wash tub 124. However, it should be appreciated that other suitable mounting locations of accelerometer 170 may be used while remaining within the scope of the present subject matter. In general, accelerometer 170 may be operably coupled to controller 166 for providing acceleration data that can be used to calculate the motion or movement of wash tub 124, such as acceleration along one or more directions. More specifically, for example, accelerometer 170 may be configured for measuring the acceleration of wash tub 124 along the vertical direction V, the lateral direction L, and/or the transverse direction T. Additionally or alternatively, accelerometer 170 may include a gyroscope that measures rotational motion, such as rotational velocity about an axis. Other types of movement measurement devices, mounting locations, and methods of detecting the movement of wash tub 124 may be used while remaining within scope of the present subject matter.

During operation of washing machine appliance 100, laundry items are loaded into wash basket 120 through opening 132, and washing operation is initiated through operator manipulation of input selectors 162. Wash tub 124 is filled with water, detergent, and/or other fluid additives, e.g., via spout 154 and or detergent drawer 156. One or more valves (e.g., control valve 158) can be controlled by washing machine appliance 100 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a final spin cycle, basket 120 is rotated at relatively high speeds and drain pump assembly 144 may discharge wash fluid from sump 142. After articles disposed in wash basket 120 are cleaned, washed, and/or rinsed, the user can remove the articles from wash basket 120, e.g., by opening door 134 and reaching into wash basket 120 through opening 132.

While described in the context of a specific embodiment of horizontal axis washing machine appliance 100, using the teachings disclosed herein it will be understood that horizontal axis washing machine appliance 100 is provided by way of example only. Other washing machine appliances having different configurations, different appearances, and/or different features may also be utilized with the present subject matter as well, e.g., vertical axis washing machine appliances.

Now that the construction of washing machine appliance 100 and the configuration of controller 166 according to exemplary embodiments have been presented, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as vertical axis washing machine appliances. In exemplary embodiments, the various method steps as disclosed herein may be performed by controller 166 or a separate, dedicated controller.

Figure 3:
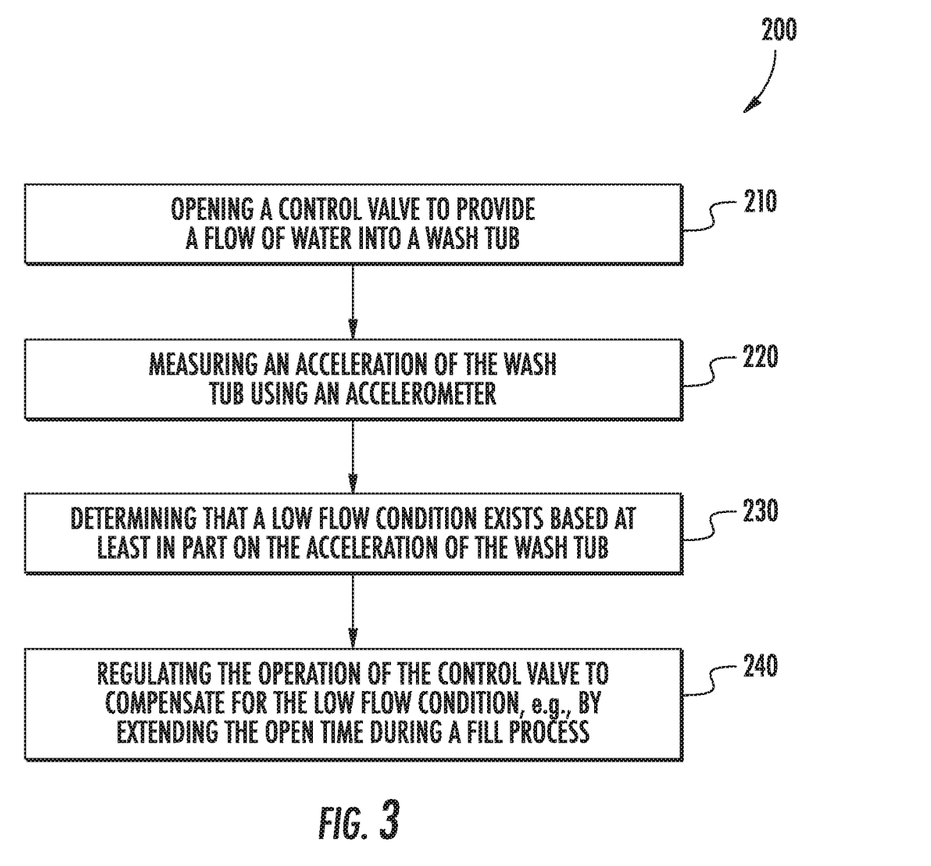
FIG. 3 illustrates a method for detecting a low flow condition in a washing machine appliance in accordance with one embodiment of the present disclosure.

Referring now to FIG. 3, method 200 includes, at step 210, opening a control valve to provide a flow of water into a wash tub. For example, continuing example from above, control valve 158 may open to provide a flow of water into detergent drawer 156, which may then pass into wash tub 124 through spout 154 as water or another wash fluid. Notably, as explained above, it is desirable to know the precise amount of wash fluid within wash tub 124, e.g., to prevent underfilling or overfilling the tub, to ensure optimal wash performance, etc. Aspects of the present subject matter are directed to systems and methods for determining such water levels, e.g., indirectly by determining the flow rate of wash fluid passing into wash tub 124.

Step 220 includes measuring an acceleration of the wash tub using an accelerometer. Specifically, accelerometer 170 of washing machine appliance 100 may measure the acceleration of wash tub 124 during the entire fill process. Notably, when water or wash fluid is flowing into tub 124 at a standard flow rate, a specific, standard acceleration or vibration profile may be generated. By contrast, if the water pressure or flow rate of water supply 155 is low, the flow rate of wash fluid may be lower than expected, thereby generating lesser vibrations or accelerations of wash tub 124.

Aspects of the present subject matter are directed towards monitoring such accelerations to approximate or estimate the flow rate or certain flow conditions. Although the examples below refer to determining the existence of a low flow condition (e.g. such as when a low pressure water supply is used or some fluid supply restriction is present), it should be appreciated that according to alternative embodiments, aspects of the present subject matter may be used to detect a high flow condition (e.g., such as when a high pressure water supply is used). Thus, the methods described herein may prevent overfilling and/or underfilling of wash tub 124.

Figure 4:
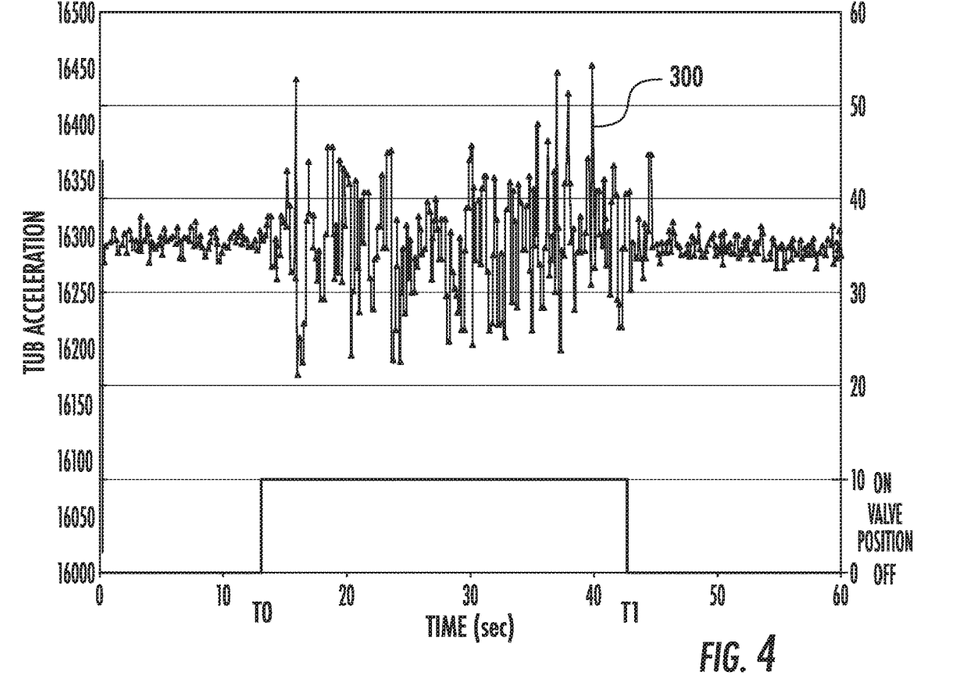
FIG. 4 provides a plot of wash tub acceleration during a normal flow fill cycle of the exemplary washing machine appliance of FIG. 1.

Specifically, step 230 includes determining that a low flow condition exists based at least in part on the acceleration of the wash tub. In this regard, for example, controller 166 may be configured for determining a flow rate of the flow of water entering wash tub 124 based on the acceleration of the wash tub 124, e.g., as measured by accelerometer 170 (see FIGS. 4 and 5, discussed below). In addition, controller 166 may store a predetermined threshold flow rate, e.g., such that a flow rate below the threshold flow rate would be considered a low flow condition. Thus, controller 166 may approximate the flow rate, e.g., based on historical acceleration data of wash tub 124 under various flow conditions, and may determine that the low flow condition exists when the actual flow rate falls below a predetermined threshold rate. Controller 166 may similarly include a high threshold rate for determining when a high flow condition exists.

Controller 166 may determine that a low flow condition exists in a variety of other manners as well. For example, according to an exemplary embodiment, controller 166 may obtain normal flow vibrations when the flow of water is supplied at a standard flow rate. In this regard, "normal flow vibrations" may be a time-based acceleration profile of wash tub 124 based on a standard water pressure and flow rate of water supply 155, a constant predetermined flow rate, etc. For example, these normal flow vibrations may be determined by the manufacturer and may be programmed into controller 166. For example, referring now to FIG. 4, an exemplary plot of vibration data of wash tub 124 is provided during a normal fill cycle. Specifically, when control valve 158 opens at a fill cycle start time (i.e., at T0) and until control valve 158 closes (i.e., at T1), the force of water flowing into wash tub 124 causes accelerometer to measure the "normal" vibrations, e.g., as identified by reference numeral 300.

Figure 5:
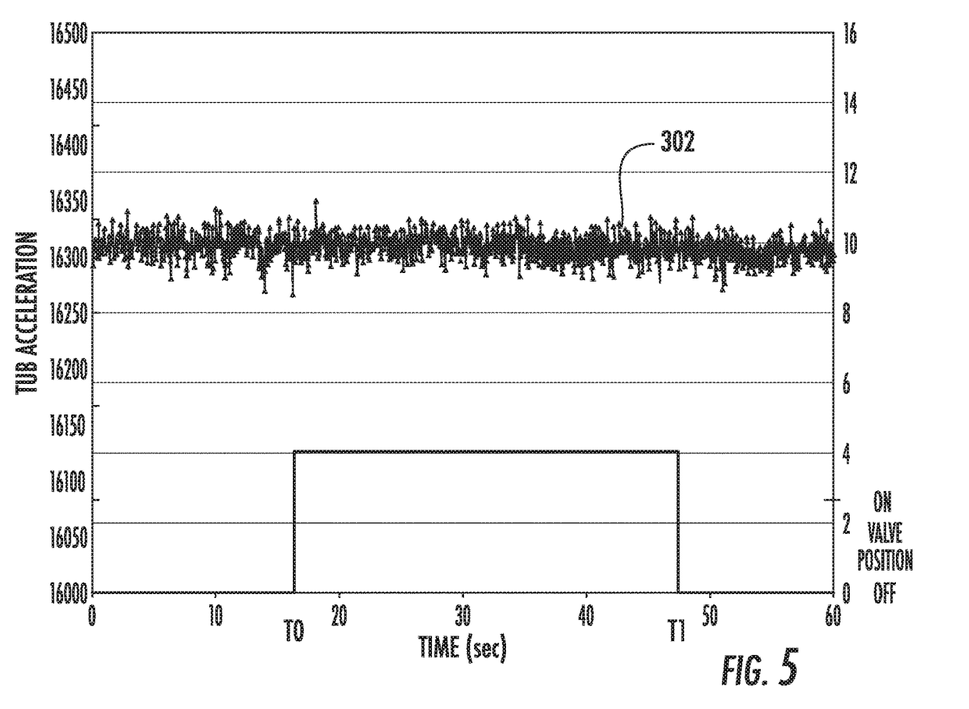
FIG. 5 provides a plot of wash tub acceleration during a low flow fill cycle of the exemplary washing machine appliance of FIG. 1.

By contrast, referring to FIG. 5, a plot of the exemplary vibration data under a low flow condition is illustrated. As shown, when control valve 158 is opened at T0, there is little to no variation in the vibration data. By comparing the actual vibration data (e.g., as identified by reference numeral 302 from FIG. 5) with the expected or normal vibration data (FIG. 4), controller 166 may determine that a low flow condition exists. Notably, the difference in vibrations between normal vibrations 300 and actual vibrations 302 may be exaggerated in the figures for the purpose of explanation. However, it should be appreciated that controller 166 may be configured for monitoring even slight variations between the normal vibrations 300 and actual vibrations 302, and may also be configured for generating a corrective response in proportion to the magnitude of such variations.

For example, according to exemplary embodiments the present subject matter, any suitable mathematical analysis of the vibration data may be used to determine whether a low-flow condition exists, whether a high flow condition exists, etc. In this regard, controller 166 may compare a standard deviation of a magnitude of the normal flow vibrations 300 to a standard deviation of a magnitude of the actual vibrations 302. According to an exemplary embodiment, for larger differences in such standard deviations, controller 166 may implement stronger corrective action, e.g., by opening control valve 158 for a longer period of time. In addition, or alternatively, controller 166 may compare peak amplitude differences between the normal flow vibrations 300 and the actual vibrations 302. Other methodologies for analyzing the differences between the expected and actual accelerometer data may be used while remaining within scope of the present subject matter.

Figure 6:
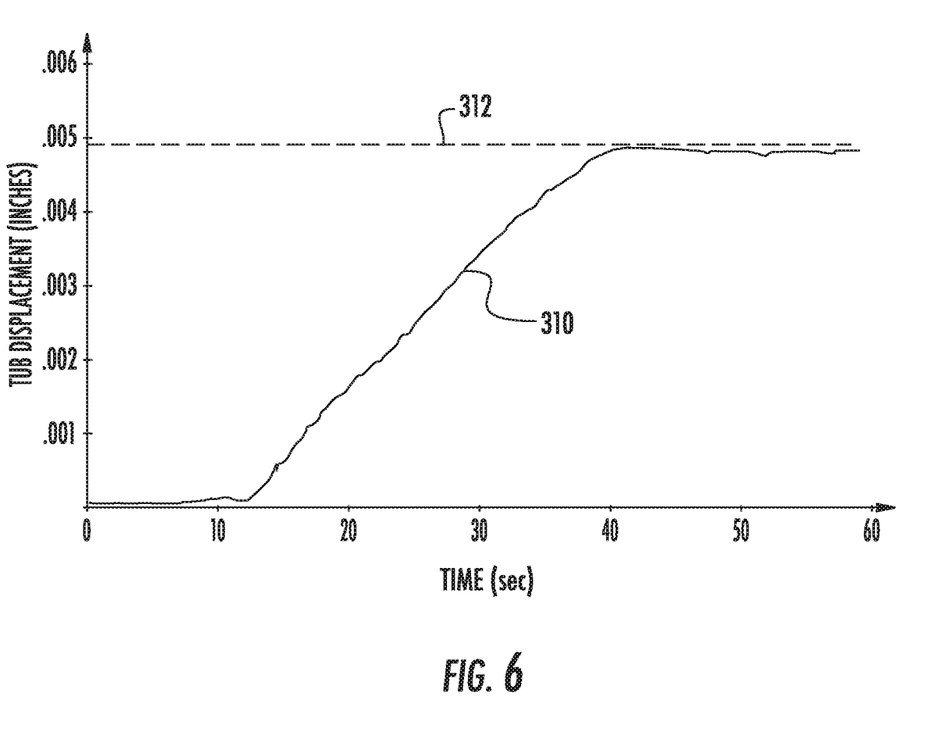
FIG. 6 provides a plot of wash tub displacement during a low flow fill cycle of the exemplary washing machine appliance of FIG. 1.
Figure 7:
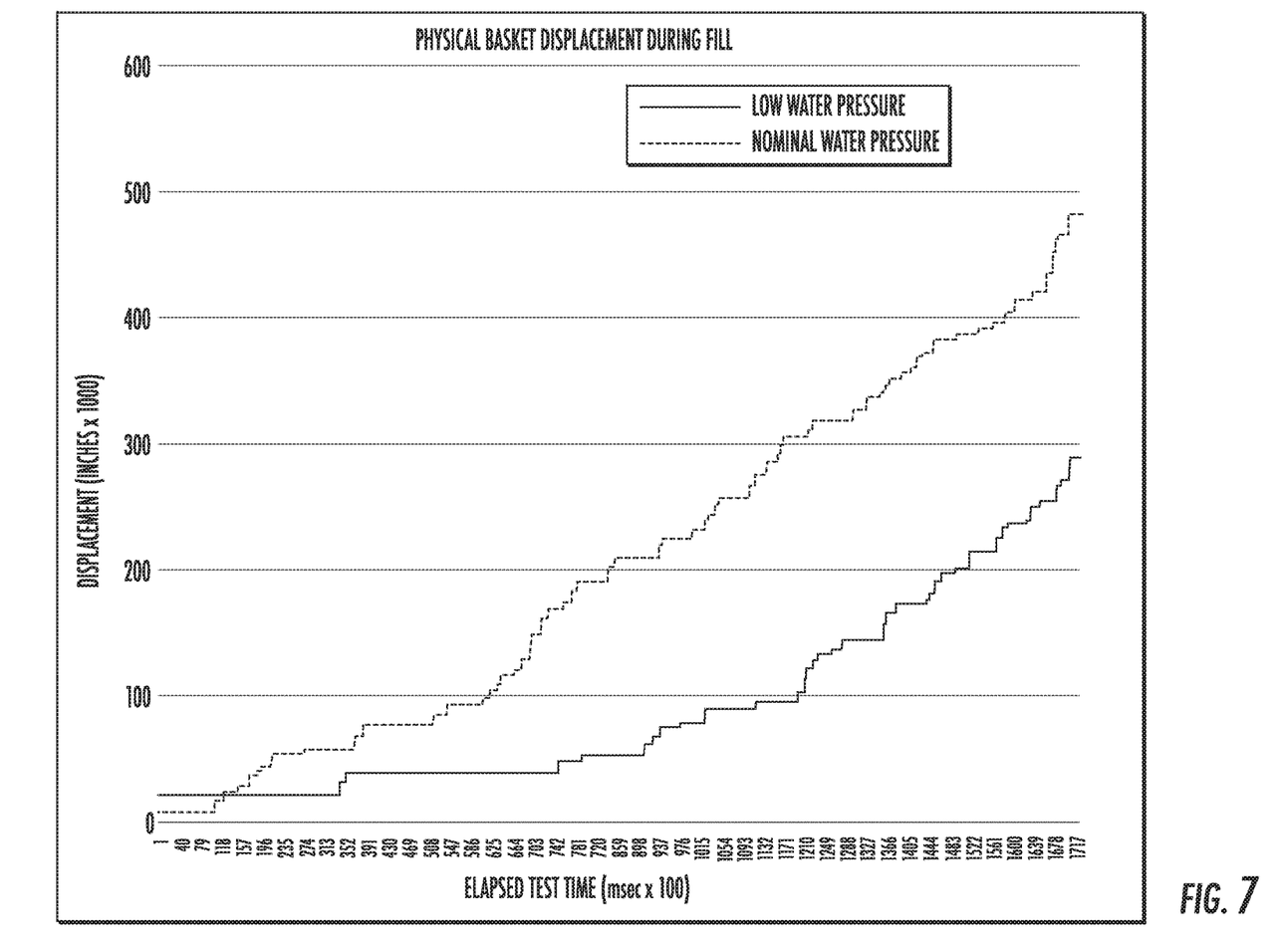
FIG. 7 provides a plot of wash tub displacement during a normal (i.e., nominal) flow fill cycle as compared to a low flow fill cycle of the exemplary washing machine appliance of FIG. 1.

Referring now to FIG. 6, controller 166 may be further configured for taking the accelerometer data and converting that data into displacement values of wash tub 124. For example, by performing a mathematical integration of the acceleration data obtained by accelerometer 170, controller 166 may approximate the actual displacement of wash tub 124 along any suitable direction. For example, FIG. 6 illustrates the displacement (e.g., identified by reference numeral 310) of wash tub 124 along the vertical direction V during a fill cycle. As illustrated, the target displacement 312 as shown in dotted lines. FIG. 7 illustrates exemplary basket displacement during a normal (e.g., nominal) flow rate or condition as compared to a low flow rate condition. As shown, the tub displacement for the low flow rate lags behind the tub displacement for a standard flow rate. This difference may be identified and used to diagnose a low flow condition.

Notably, if water is being added to wash tub 124 at the desired flow rate, the slope of displacement 310 will be known and constant. However, if the slope of the displacement is larger than a slope associated with a normal flow condition, controller 166 may determine that there is a high flow condition or flow rate. By contrast, if the slope of displacement 310 is lower than a slope associated with the normal condition, controller 166 may determine that there is a low flow condition or flow rate. Thus, method 200 may include obtaining a slope of the displacement curve over time while control valve 158 is open and determining that the slope is less than a predetermined slope (e.g. a predetermined slope associated with normal flow condition).

If a low flow condition (or high flow condition) is detected, controller 166 may implement corrective action by adjusting the control algorithm used to regulate control valve 158. For example, referring again to FIG. 3, step 240 includes regulating the operation of the control valve to compensate for the low flow condition, e.g., by extending the open time during a fill process. For example, regulating the operation of control valve 158 compensate for the low-flow condition may include extending an open time of the control valve in proportion to the variation between the measured displacement slope and the normal displacement slope.

In this regard, for example, when a standard flow rate is assumed, controller 166 opens control valve 158 for a specific time (e.g., in seconds) equivalent to the target volume (e.g., in gallons) divided by the flow rate (e.g., in gallons/second). However, if the flow rate is lower than the standard flow rate such that a low flow rate condition exists, opening control valve 158 for the same amount of time will result in fewer gallons being dispensed into wash tub 124. Thus, when a low flow condition is detected, controller 166 may leave control valve 158 open for a longer duration. According to exemplary embodiments, the duration of time may be determined in part based on the magnitude difference of normal vibrations 300 and actual vibrations 302. For example, the open time may be extended by a time that is inversely proportional to the magnitude of the difference between normal vibrations 300 and actual vibrations 302. Other control methodologies are possible and within scope of the present subject matter.

According to alternative embodiments, method 200 may include providing a user notification after detecting the existence of a low flow condition. For example, the user notification may be provided via display 164, via communication with an external device, or in any other suitable manner. In addition, the user notification may include a recommendation to schedule a service call, order a new part, or perform other corrective action.

FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using washing machine appliance 100 as an example, it should be appreciated that these methods may be applied to the operation of any suitable washing machine appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:
   a cabinet;

a wash tub positioned within the cabinet and defining a wash chamber for receipt of a load of articles for washing;

a control valve for regulating a flow of water from a water supply into the wash chamber;

an accelerometer operably coupled to the wash tub; and a controller operably coupled to the control valve and the accelerometer, the controller being configured for:

opening the control valve to provide the flow of water into the wash tub;

measuring an acceleration of the wash tub using the accelerometer; and determining that a low flow condition exists based at least in part on the acceleration of the wash tub.

2. The washing machine appliance of claim 1, wherein the controller is further configured for:

determining a flow rate of the flow of water entering wash tub based on the acceleration of the wash tub; and determining that the low flow condition exists if the flow rate falls below a predetermined threshold flow rate.

3. The washing machine appliance of claim 1, wherein a displacement of the wash tub is calculated by integrating the acceleration.

4. The washing machine appliance of claim 3, wherein determining that the low flow condition exists comprises:

obtaining a slope of the displacement over time while the control valve is open; and determining that the slope is less than a predetermined slope.

5. The washing machine appliance of claim 1, wherein the controller is further configured for:

obtaining normal flow vibrations when the flow of water has a standard flow rate;

measuring actual vibrations after the control valve is opened; and comparing the normal flow vibrations to the actual vibrations to determine whether a low flow condition exists.

6. The washing machine appliance of claim 5, wherein comparing the normal flow vibrations to the actual vibrations to determine whether the low flow condition exists comprises:

comparing a standard deviation of a magnitude of the normal flow vibrations to a standard deviation of a magnitude of the actual vibrations.

7. The washing machine appliance of claim 5, comparing the normal flow vibrations to the actual vibrations to determine whether the low flow condition exists comprises:

comparing peak amplitude differences between the normal flow vibrations to the actual vibrations.

8. The washing machine appliance of claim 1, wherein the controller is further configured for:

providing a user notification when the low flow condition is detected.

9. The washing machine appliance of claim 1, wherein the controller is further configured for:

regulating the operation of the control valve to compensate for the low flow condition.

10. The washing machine appliance of claim 9, wherein regulating the operation of the control valve to compensate for the low flow condition comprises extending an open time of the control valve.

11. The washing machine appliance of claim 10, wherein the open time of the control valve is extended by a time that is inversely proportional to a magnitude of the difference between an average magnitude of normal flow vibrations and an average magnitude of actual vibrations.

12. The washing machine appliance of claim 1, wherein the accelerometer is mounted to a front of the wash tub.

13. The washing machine appliance of claim 1, wherein the washing machine appliance is a horizontal axis washing machine appliance.

14. A method of operating a washing machine appliance, the washing machine comprising a wash tub, an accelerometer operably coupled to the wash tub, and a control valve for supplying a flow of water into the wash tub, the method comprising opening the control valve to provide the flow of water into the wash tub;

measuring an acceleration of the wash tub using the accelerometer; and determining that a low flow condition exists based at least in part on the acceleration of the wash tub.

15. The method of claim 14, further comprising:

determining a flow rate of the flow of water entering wash tub based on the acceleration of the wash tub; and determining that the low flow condition exists if the flow rate falls below a predetermined threshold flow rate.

16. The method of claim 14, wherein a displacement of the wash tub is calculated by integrating the acceleration, and wherein determining that the low flow condition exists comprises:

obtaining a slope of the displacement over time while the control valve is open; and determining that the slope is less than a predetermined slope.

17. The method of claim 14, further comprising:

obtaining normal flow vibrations when the flow of water has a standard flow rate;

measuring actual vibrations after the control valve is opened; and comparing the normal flow vibrations to the actual vibrations to determine whether a low flow condition exists.

18. The method of claim 17, comparing the normal flow vibrations to the actual vibrations to determine whether the low flow condition exists comprises:

comparing a standard deviation of a magnitude of the normal flow vibrations to a standard deviation of a magnitude of the actual vibrations.

19. The method of claim 17, comparing the normal flow vibrations to the actual vibrations to determine whether the low flow condition exists comprises:

comparing peak amplitude differences between the normal flow vibrations to the actual vibrations.

20. The method of claim 14, further comprising:

regulating the operation of the control valve to compensate for the low flow condition.

* * * * *